(12) United States Patent
Golshan

(10) Patent No.: US 9,756,071 B1
(45) Date of Patent: Sep. 5, 2017

(54) DNS DENIAL OF SERVICE ATTACK PROTECTION

(71) Applicant: A10 Networks, Inc., San Jose, CA (US)

(72) Inventor: Ali Golshan, Palo Alto, CA (US)

(73) Assignee: A10 NETWORKS, INC., San Jose, CA (US)

( * ) Notice: Subject to any disclaimer, the term of this patent is extended or adjusted under 35 U.S.C. 154(b) by 0 days.

(21) Appl. No.: 14/487,834

(22) Filed: Sep. 16, 2014

(51) Int. Cl.
*H04L 29/06* (2006.01)
*G06F 17/30* (2006.01)

(52) U.S. Cl.
CPC .... *H04L 63/1458* (2013.01); *G06F 17/30864* (2013.01)

(58) Field of Classification Search
None
See application file for complete search history.

(56) References Cited

U.S. PATENT DOCUMENTS

| | | |
|---|---|---|
| 4,001,819 A | 1/1977 | Wise |
| 4,780,905 A | 10/1988 | Cruts et al. |
| 5,101,402 A | 3/1992 | Chiu et al. |
| 5,163,088 A | 11/1992 | LoCascio |
| 5,359,659 A | 10/1994 | Rosenthal |
| 5,414,833 A | 5/1995 | Hershey et al. |
| 5,511,122 A | 4/1996 | Atkinson |
| 5,584,023 A | 12/1996 | Hsu |
| 5,684,875 A | 11/1997 | Ellenberger |
| 5,757,908 A | 5/1998 | Cooper et al. |
| 5,805,801 A | 9/1998 | Holloway et al. |
| 5,835,727 A | 11/1998 | Wong et al. |
| 5,892,903 A | 4/1999 | Klaus |
| 5,905,859 A | 5/1999 | Holloway et al. |
| 5,940,002 A | 8/1999 | Finn et al. |
| 5,960,177 A | 9/1999 | Tanno |
| 6,006,272 A | 12/1999 | Aravamudan et al. |
| 6,170,061 B1 | 1/2001 | Beser |
| 6,185,681 B1 | 2/2001 | Zizzi |
| 6,205,115 B1 | 3/2001 | Ikebe et al. |
| 6,219,706 B1 | 4/2001 | Fan et al. |
| 6,237,036 B1 | 5/2001 | Ueno et al. |
| 6,249,866 B1 | 6/2001 | Brundrett et al. |
| 6,259,789 B1 | 7/2001 | Paone |
| 6,347,376 B1 | 2/2002 | Attwood et al. |
| 6,363,486 B1 | 3/2002 | Knapton, III |
| 6,449,651 B1 | 9/2002 | Dorfman et al. |

(Continued)

FOREIGN PATENT DOCUMENTS

| | | |
|---|---|---|
| TW | 477140 | 2/2002 |
| TW | 574655 | 2/2004 |

(Continued)

OTHER PUBLICATIONS

Oracle Corporation. Oracle Intelligent Agent User's Guide, Release 9.2.0, Part No. A96676-01. Mar. 2002.

(Continued)

*Primary Examiner* — Trang Doan (57) ABSTRACT

Exemplary embodiments for protecting a data network from a DNS denial of service attack are disclosed. The systems and methods provide for the use of a shared DNS cache between DNS UDP and DNS TCP proxy servers, to enable detection and mitigation of DNS denial of service attacks.

19 Claims, 6 Drawing Sheets

(56) References Cited

U.S. PATENT DOCUMENTS

| | | |
|---|---|---|
| 6,505,192 B1 | 1/2003 | Godwin et al. |
| 6,539,435 B2 | 3/2003 | Bolmarcich et al. |
| 6,553,005 B1 | 4/2003 | Skirmont et al. |
| 6,578,147 B1 | 6/2003 | Shanklin et al. |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,973,040 B1 | 12/2005 | Ricciulli |
| 6,988,106 B2 | 1/2006 | Enderwick et al. |
| 7,092,357 B1 | 8/2006 | Ye |
| 7,194,766 B2 | 3/2007 | Noehring et al. |
| 7,200,760 B2 | 4/2007 | Riebe et al. |
| 7,221,757 B2 | 5/2007 | Alao |
| 7,234,161 B1 | 6/2007 | Maufer et al. |
| 7,277,963 B2 | 10/2007 | Dolson et al. |
| 7,372,809 B2* | 5/2008 | Chen ............... H04L 29/12066 370/229 |
| 7,392,241 B2 | 6/2008 | Lin et al. |
| 7,409,712 B1 | 8/2008 | Brooks et al. |
| 7,418,733 B2 | 8/2008 | Connary et al. |
| 7,478,429 B2 | 1/2009 | Lyon |
| 7,533,409 B2 | 5/2009 | Keane et al. |
| 7,543,052 B1 | 6/2009 | Cesa Klein |
| 7,577,833 B2 | 8/2009 | Lai |
| 7,596,695 B2 | 9/2009 | Liao et al. |
| 7,620,733 B1* | 11/2009 | Tzakikario ............ G06F 15/16 709/229 |
| 7,665,138 B2 | 2/2010 | Song et al. |
| 7,739,494 B1 | 6/2010 | McCorkendale et al. |
| 7,823,194 B2 | 10/2010 | Shay |
| 7,845,004 B2 | 11/2010 | Bardsley et al. |
| 7,925,766 B2 | 4/2011 | Jayawardena et al. |
| 7,953,855 B2 | 5/2011 | Jayawardena et al. |
| 8,010,469 B2 | 8/2011 | Kapoor et al. |
| 8,089,871 B2 | 1/2012 | Iloglu et al. |
| 8,220,056 B2 | 7/2012 | Owens, Jr. |
| 8,239,670 B1 | 8/2012 | Kaufman et al. |
| 8,276,203 B2 | 9/2012 | Nakhre et al. |
| 8,286,227 B1 | 10/2012 | Zheng |
| 8,301,802 B2 | 10/2012 | Wei et al. |
| 8,375,453 B2 | 2/2013 | Jackson et al. |
| 8,448,245 B2 | 5/2013 | Banerjee et al. |
| 8,478,708 B1 | 7/2013 | Larcom |
| 8,595,845 B2 | 11/2013 | Basavapatna et al. |
| 8,719,446 B2 | 5/2014 | Spatscheck et al. |
| 8,800,034 B2 | 8/2014 | McHugh et al. |
| 8,813,228 B2 | 8/2014 | Magee et al. |
| 8,832,832 B1 | 9/2014 | Visbal |
| 8,881,284 B1 | 11/2014 | Gabriel |
| 8,948,380 B2 | 2/2015 | Goto |
| 9,129,116 B1 | 9/2015 | Wiltzius |
| 9,130,996 B1 | 9/2015 | Martini |
| 9,215,208 B2 | 12/2015 | Fraize et al. |
| 9,245,121 B1* | 1/2016 | Luo .................... H04L 63/1408 |
| 9,246,926 B2 | 1/2016 | Erlingsson et al. |
| 9,294,503 B2 | 3/2016 | Thompson et al. |
| 9,300,623 B1* | 3/2016 | Earl ................... H04L 61/1511 |
| 9,571,465 B1 | 2/2017 | Sharifi Mehr et al. |
| 9,584,318 B1 | 2/2017 | Yang et al. |
| 2001/0042204 A1 | 11/2001 | Blaker et al. |
| 2002/0087708 A1 | 7/2002 | Low et al. |
| 2002/0108059 A1 | 8/2002 | Canion et al. |
| 2002/0165912 A1 | 11/2002 | Wenocur et al. |
| 2002/0188839 A1 | 12/2002 | Noehring et al. |
| 2003/0023846 A1 | 1/2003 | Krishna et al. |
| 2003/0023876 A1 | 1/2003 | Bardsley et al. |
| 2003/0028585 A1 | 2/2003 | Yeager et al. |
| 2003/0035547 A1 | 2/2003 | Newton |
| 2003/0061507 A1 | 3/2003 | Xiong et al. |
| 2003/0069973 A1 | 4/2003 | Ganesan et al. |
| 2003/0123667 A1 | 7/2003 | Weber et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0057579 A1 | 3/2004 | Fahrny |
| 2004/0059951 A1 | 3/2004 | Pinkas et al. |
| 2004/0059952 A1 | 3/2004 | Newport et al. |
| 2004/0091114 A1 | 5/2004 | Carter et al. |
| 2004/0093524 A1 | 5/2004 | Sakai |
| 2004/0111635 A1 | 6/2004 | Boivie et al. |
| 2004/0148520 A1 | 7/2004 | Talpade et al. |
| 2004/0172538 A1 | 9/2004 | Satoh et al. |
| 2004/0187032 A1 | 9/2004 | Gels et al. |
| 2005/0021999 A1 | 1/2005 | Touitou et al. |
| 2005/0041584 A1 | 2/2005 | Lau et al. |
| 2005/0044068 A1 | 2/2005 | Lin et al. |
| 2005/0044352 A1* | 2/2005 | Pazi .................. H04L 29/12066 713/153 |
| 2005/0125684 A1 | 6/2005 | Schmidt |
| 2005/0180416 A1 | 8/2005 | Jayawardena et al. |
| 2005/0193199 A1 | 9/2005 | Asokan et al. |
| 2005/0198099 A1* | 9/2005 | Motsinger ............... G06F 21/55 709/200 |
| 2005/0235145 A1 | 10/2005 | Slick et al. |
| 2005/0257093 A1 | 11/2005 | Johnson et al. |
| 2005/0278623 A1 | 12/2005 | Liao et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0179319 A1 | 8/2006 | Krawczyk |
| 2006/0185014 A1 | 8/2006 | Spatscheck et al. |
| 2006/0230444 A1 | 10/2006 | Iloglu et al. |
| 2006/0265585 A1 | 11/2006 | Lai |
| 2007/0143769 A1 | 6/2007 | Bu et al. |
| 2007/0169194 A1 | 7/2007 | Church et al. |
| 2007/0186282 A1 | 8/2007 | Jenkins |
| 2007/0214088 A1 | 9/2007 | Graham et al. |
| 2007/0280114 A1 | 12/2007 | Chao et al. |
| 2007/0283429 A1 | 12/2007 | Chen et al. |
| 2008/0183885 A1 | 7/2008 | Durrey et al. |
| 2008/0256623 A1 | 10/2008 | Worley et al. |
| 2009/0077663 A1 | 3/2009 | Sun et al. |
| 2009/0083537 A1 | 3/2009 | Larsen et al. |
| 2009/0168995 A1 | 7/2009 | Banga et al. |
| 2010/0131646 A1* | 5/2010 | Drako ................ H04L 29/12066 709/225 |
| 2010/0138921 A1 | 6/2010 | Na et al. |
| 2010/0284300 A1 | 11/2010 | Deshpande et al. |
| 2011/0082947 A1 | 4/2011 | Szeto et al. |
| 2011/0093785 A1 | 4/2011 | Lee et al. |
| 2011/0131646 A1 | 6/2011 | Park et al. |
| 2011/0138177 A1 | 6/2011 | Qiu et al. |
| 2011/0153744 A1 | 6/2011 | Brown |
| 2011/0188452 A1 | 8/2011 | Borleske et al. |
| 2011/0249572 A1 | 10/2011 | Singhal et al. |
| 2011/0282997 A1* | 11/2011 | Prince ................. G06Q 30/0251 709/226 |
| 2012/0036272 A1 | 2/2012 | El Zur |
| 2012/0042060 A1 | 2/2012 | Jackowski et al. |
| 2012/0096546 A1 | 4/2012 | Dilley et al. |
| 2012/0110472 A1 | 5/2012 | Amrhein et al. |
| 2012/0144461 A1 | 6/2012 | Rathbun |
| 2012/0155274 A1 | 6/2012 | Wang et al. |
| 2012/0159623 A1* | 6/2012 | Choi ................ H04L 61/1511 726/22 |
| 2012/0163186 A1 | 6/2012 | Wei et al. |
| 2012/0170753 A1 | 7/2012 | Pandrangi et al. |
| 2012/0173684 A1* | 7/2012 | Courtney ........... H04L 29/12066 709/222 |
| 2012/0174196 A1 | 7/2012 | Bhogavilli et al. |
| 2012/0227109 A1 | 9/2012 | Dimuro |
| 2012/0250866 A1 | 10/2012 | Matsuo |
| 2012/0260329 A1 | 10/2012 | Suffling |
| 2012/0266242 A1 | 10/2012 | Yang et al. |
| 2013/0019025 A1 | 1/2013 | Chaturvedi et al. |
| 2013/0103834 A1 | 4/2013 | Dzerve et al. |
| 2013/0139245 A1 | 5/2013 | Thomas |
| 2013/0198845 A1 | 8/2013 | Anvari |
| 2013/0212265 A1 | 8/2013 | Rubio Vidales et al. |

(56) References Cited

U.S. PATENT DOCUMENTS

| | | | |
|---|---|---|---|
| 2013/0227646 | A1 | 8/2013 | Haggerty et al. |
| 2013/0243194 | A1 | 9/2013 | Hawkes et al. |
| 2013/0263256 | A1 | 10/2013 | Dickinson et al. |
| 2014/0137190 | A1 | 5/2014 | Carey et al. |
| 2014/0258536 | A1 | 9/2014 | Chiong |
| 2014/0269308 | A1 | 9/2014 | Oshiba |
| 2014/0280832 | A1 | 9/2014 | Oshiba |
| 2014/0325588 | A1 | 10/2014 | Jalan et al. |
| 2014/0325648 | A1 | 10/2014 | Liu et al. |
| 2014/0344925 | A1* | 11/2014 | Muthiah ............ H04L 61/1511 726/22 |
| 2015/0033341 | A1 | 1/2015 | Schmidtler et al. |
| 2015/0058977 | A1 | 2/2015 | Thompson et al. |
| 2015/0143118 | A1 | 5/2015 | Sheller et al. |
| 2015/0220745 | A1 | 8/2015 | Nellitheertha et al. |
| 2015/0281177 | A1 | 10/2015 | Sun |
| 2016/0036651 | A1 | 2/2016 | Sureshchandra et al. |
| 2016/0134655 | A1 | 5/2016 | Thompson et al. |
| 2016/0182509 | A1 | 6/2016 | Kantecki et al. |
| 2016/0226896 | A1 | 8/2016 | Bhogavilli et al. |

FOREIGN PATENT DOCUMENTS

| | | |
|---|---|---|
| TW | NI197237 | 2/2004 |
| TW | I225999 | 1/2005 |
| TW | I241818 | 10/2005 |
| TW | I252976 | 4/2006 |
| WO | WO9842108 | 9/1998 |
| WO | WO9948303 A2 | 9/1999 |
| WO | WO0062167 A1 | 10/2000 |
| WO | WO2006039529 | 4/2006 |
| WO | WO2014150617 | 9/2014 |
| WO | WO2014151072 | 9/2014 |
| WO | WO2014176461 | 10/2014 |
| WO | WO2015030977 | 3/2015 |

OTHER PUBLICATIONS

SOL11243. iRules containing the RULE_NIT iRule event do not re-initialize when a syntax error is corrected. f5.support.com. May 24, 2010.

Mutz, "Linux Encryption How To," available at http://encryptionhowto.sourceforge.net/Encryption-HOWTO-1.html, Oct. 4, 2000.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007.

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979.

Dainotti, Albert et al. TIE: A Community-Oriented Traffic Classification Platform. May 11, 2009. Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Liebergeld, Steffen et al., "Cellpot: A Concept for Next Generation Cellular Network Honeypots," Internet Society, Feb. 23, 2014, pp. 1-6.

Kaufman, Charlie et al., "DoS Protection for UDP-Based Protocols," CCS 2003, Oct. 27-31, 2003, pp. 2-7.

Castelluccia, Claude et al., "Improving Secure Server Performance by Re-balancing SSL/TLS Handshakes," ASIACCS 2006, Mar. 21-24, 2006, pp. 26-34.

"Network- vs. Host-based Intrusion Detection, a Guide to Intrusion Detection Technology", Oct. 2, 1998, Internet Security Systems [online], Retrieved from the Internet: <URL:http://documents.iss.net/whitepapers/nvh-ids.pdf>, 10 pages.

Hunt, Guerney D. H. et al., "Network Dispatcher: a connection router for scalable Internet services", 1998, Proceedings of the 7th International World Wide Web Conference (WWW7), Retrieved from the Internet: <URL:http://www.unizh.ch/home/mazzo/reports/www7conf/fullpapers/1899/com1899.htm>, 14 pages.

Spatscheck et al., "Optimizing TCP Forwarder Performance", IEEE/ACM Transactions on Networking, vol. 8, No. 2, Apr. 2000, pp. 146-157.

Lee, Patrick P. C. et al., "On the Detection of Signaling DoS Attacks on 3G Wireless Networks," IEEE INFOCOM 2007—26th IEEE International Conference on Computer Communications proceedings, May 6-12, 2007, pp. 1289-1297.

Thanasegaran et al., "Simultaneous Analysis of Time and Space for Conflict Detection in Time-Based Firewall Policies," Jul. 2010, IEEE 10th International Conference on Computer and Information Technology, pp. 1015-1021.

* cited by examiner

DNS DENIAL OF SERVICE ATTACK PROTECTION

BACKGROUND OF THE INVENTION

Field of the Invention

The present invention relates generally to data networks, and more particularly to a data network being protected from a DNS denial of service attack.

Description of the Related Art

Data network security is an important and critical component of the Internet. In particular, the proper operation of a Domain Name System (DNS) data network is crucial to the operation of the Internet, public cloud networks, mobile broadband networks, as well as private networks. Attacks to DNS data networks are common. Often such attacks address individual websites or a number of companies. Sometimes, attacks are targeted to major infrastructure of an Internet Service Provider (ISP). Many of these DNS attacks are in the form of a denial of service (DOS) attack. If an attack is successful, one or more DNS servers will be under stress and cannot serve legitimate DNS requests from client computers. The client computers, not able to determine the application servers for the DNS requests, in turn deny services to the users, rendering Internet services, such as web services, email services, document services, or video services, offered by those application servers unavailable. Often times, the stressed DNS servers may take hours or days to recover to normal operation, causing major disruption of services, as well as financial damage to merchants and inconvenience to clients.

A typical DNS denial of service attack is presented in a form of malformed DNS requests using unknown or unanswerable domain names, and perhaps invalid network addresses. Each malformed DNS request is intended to cause a DNS server to spend computation resources to resolve an unanswerable domain name. Through sending a large number of malformed DNS requests in a short period of time, a DNS server would have to spend all of its computation resource to handle these DNS requests.

The present invention proposes a method and system to handle the massive malformed DNS requests with little or no involvement of a DNS server, and therefore protects the DNS server from these nasty DNS denial of service attacks.

It should be apparent from the foregoing that there is a need to provide a method to protect a data network from DNS denial of service attacks.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for protecting a data network from a DNS denial of service attack. An exemplary method for a DNS proxy server to to protect a data network from a Domain Name Service (DNS) denial of service attack comprises receiving a DNS UDP request from a client; determining a domain name included in the DNS UDP request does not match with a plurality of domain names in a DNS entry table at the DNS proxy server; responding to the client to retry the DNS UDP request as a DNS TCP request; querying a DNS server for the domain name in the DNS TCP request; receiving a DNS response from the DNS server; and determining that the DNS UDP request from the client is a DNS denial of service attack.

A system for protecting a data network from a DNS denial of service attack is also disclosed. The system may comprise a DNS proxy server configured to receive a DNS UDP request from a client; determine a domain name included in the DNS UDP request does not match a plurality of domain names in a DNS entry table at the DNS proxy server; and respond to the client to retry the DNS UDP request as a DNS TCP request.

In further example embodiments of the present disclosure, the method steps are stored on a machine-readable medium comprising instructions, which when implemented by one or more processors, perform the recited steps. In further example embodiments, hardware systems, or devices, can be adapted to perform the recited steps. Other features, examples, and embodiments are described below.

BRIEF DESCRIPTION OF DRAWINGS

Embodiments are illustrated by way of example and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

Figure 1A:
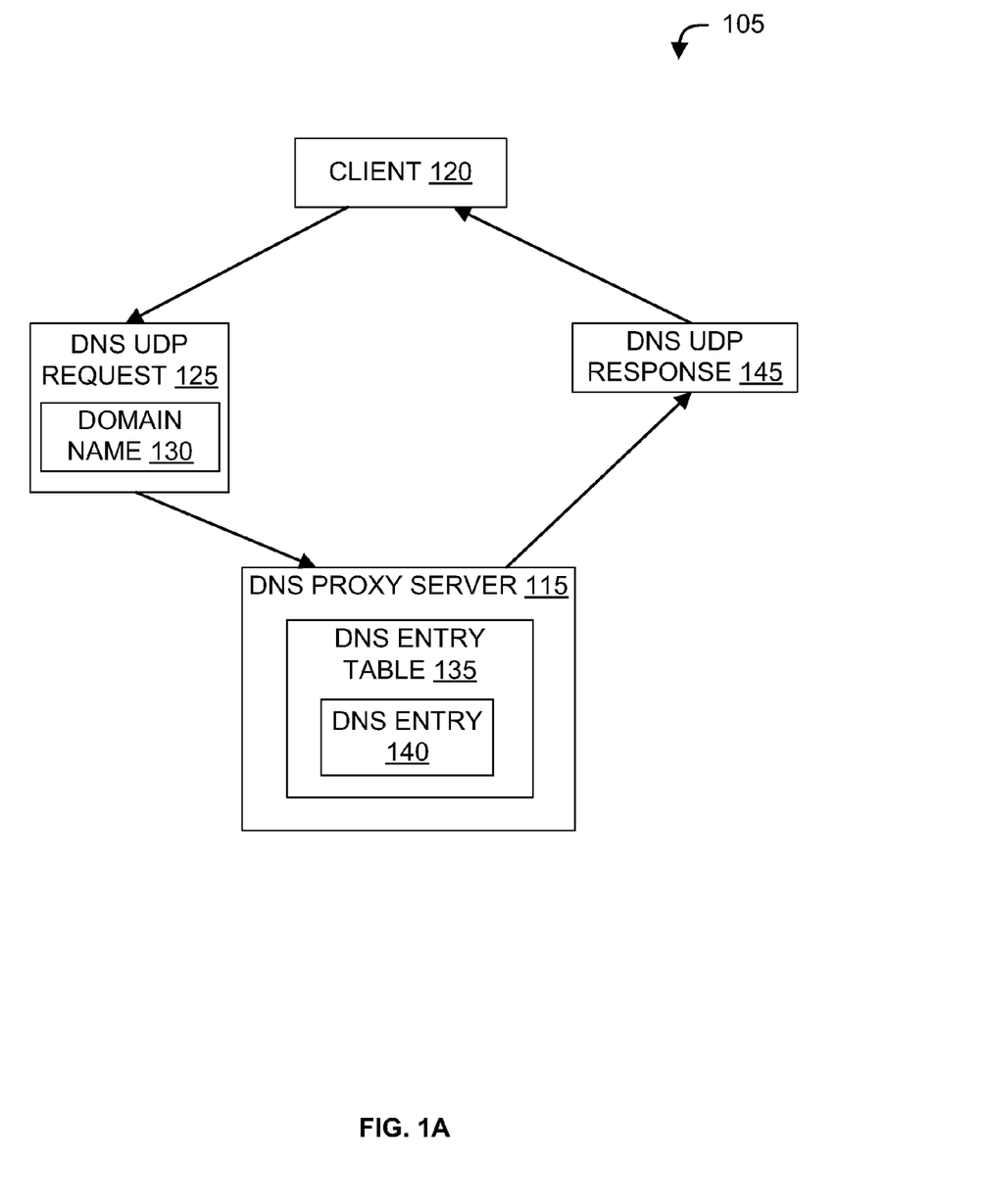
FIGS. 1A-1C illustrate exemplary embodiments of responding to a client DNS request.
Figure 1B:
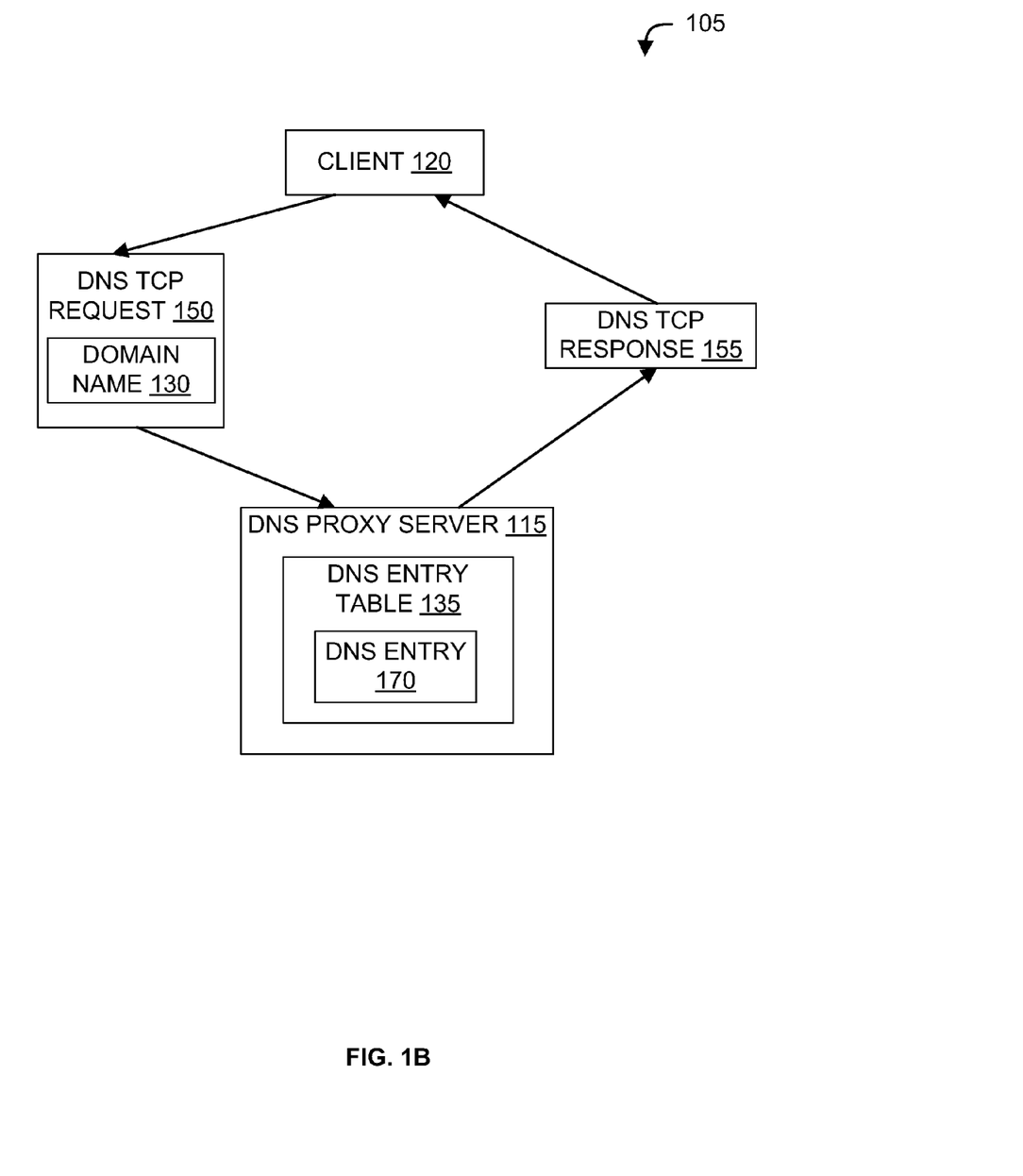
Figure 1C:
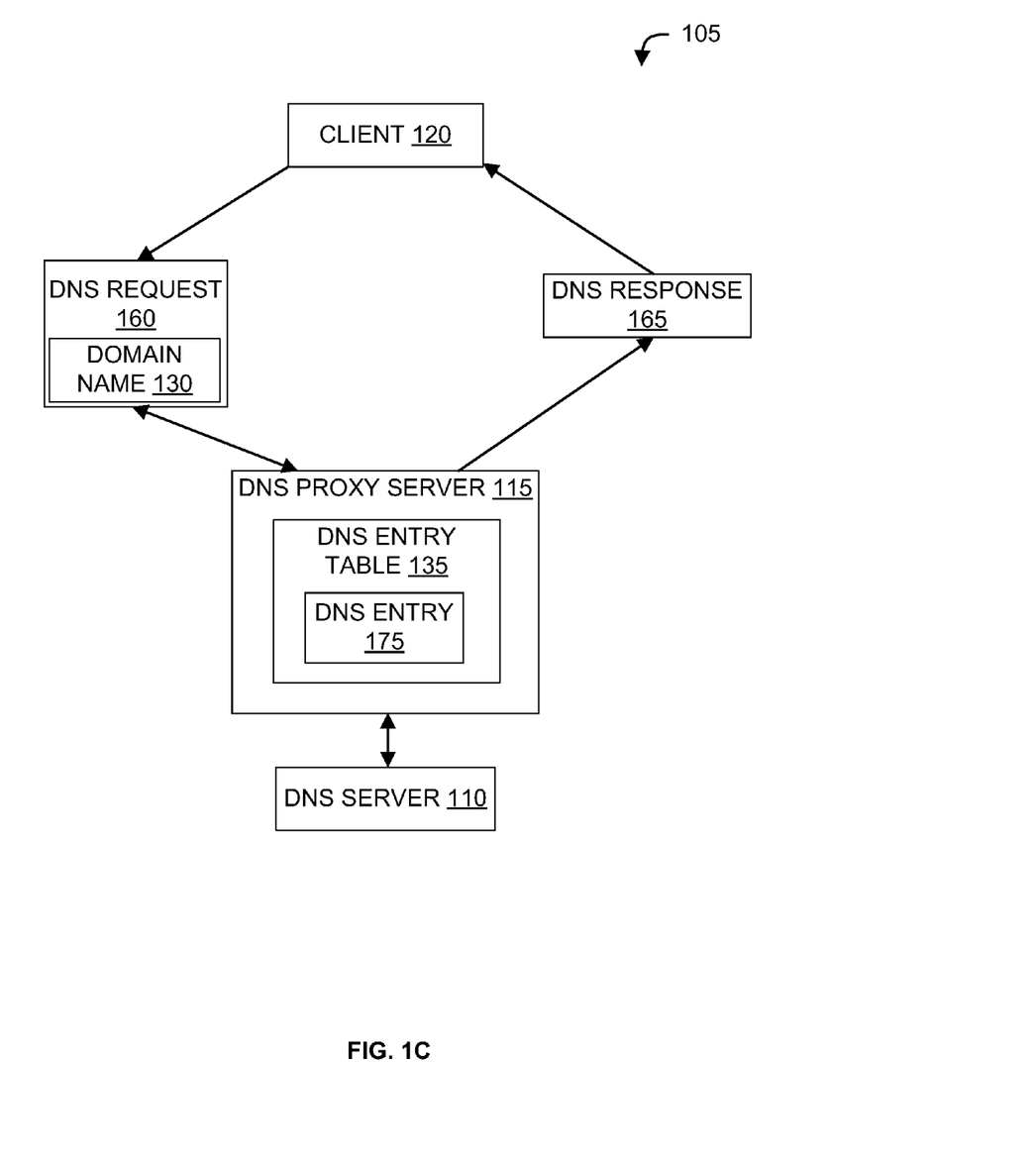

FIGS. 1A-1C illustrate exemplary embodiments of a Domain Name Service (DNS) data network servicing DNS requests so as to prevent DNS denial of service attacks. In the exemplary embodiments, data network 105 comprises a plurality of network devices such as a DNS server 110 and a DNS proxy server 115. DNS proxy server 115 receives and responds to DNS requests from clients such as client 120.

In an exemplary embodiment illustrated in FIG. 1A, client 120 sends a DNS UDP request 125 using User Datagram Protocol (UDP) over data network 105. DNS UDP request 125 may include a domain name 130. DNS proxy server 115 receives DNS UDP request 125 and retrieves domain name 130 from UDP request 125. In various embodiments, DNS proxy server 115 includes a DNS entry table 135, which includes a plurality of DNS entries. Each of the plurality of DNS entries in DNS entry table 135 includes a domain name and at least one corresponding network address for the domain name. In some embodiments, DNS proxy server 115 matches domain name 130 against the plurality of domain names in DNS entry table 135.

In exemplary embodiments, DNS proxy server 115 determines that there is a match between domain name 130 and a domain name of DNS entry 140 of DNS entry table 135. DNS proxy server 115 finds a corresponding network address for the domain name from DNS entry 140, and sends a DNS UDP response 145 using DNS entry 140 to client 120.

Sometimes DNS proxy server 115 does not find a match between domain name 130 and DNS entry table 135. Subsequently, DNS proxy server 115 sends a DNS UDP response 145 indicating no result is found. DNS proxy server 115 then indicates in a DNS UDP response 145 to ask client 120 to send a DNS request using Transmission Control Protocol (TCP). In some embodiments, DNS proxy server 115 sets a truncated bit (TC bit) in the DNS UDP response 145. In another embodiment, DNS proxy server 115 sets a different indication in the DNS UDP response 145.

Client 120 may receive a DNS UDP response 145 indicating a need to use TCP protocol. In an exemplary embodiment illustrated in FIG. 1B, client 120 sends a DNS TCP request 150 for domain name 130, using TCP protocol. DNS proxy server 115 then receives DNS TCP request 150 and retrieves domain name 130 from DNS TCP request 150. DNS proxy server 115 matches domain name 130 against DNS entry table 135.

In some embodiments, DNS proxy server 115 finds a match of domain name 130 with DNS entry 170 of DNS entry table 135. DNS proxy server 115 sends a DNS TCP response 155 to DNS TCP request 150 to client 120. DNS proxy server 115 includes DNS entry 170 in DNS TCP response 155. In various embodiments, DNS proxy server 115 does not find a match of domain name 130 with DNS entry table 135.

In an exemplary embodiment illustrated in FIG. 1C, DNS proxy server 115 sends a DNS request 160, either using UDP or TCP protocol, to DNS server 110. DNS proxy server 115 includes domain name 130 in DNS request 160. In various embodiments, DNS proxy server 115 receives a DNS response 165 for DNS request 160 from DNS server 110. DNS response 165 provides a DNS entry result for domain name 130. DNS proxy server 115 creates a DNS entry 175 using the DNS entry result of domain name 130 in DNS response 165, and stores DNS entry 175 in DNS entry table 135 in order to respond to future DNS UDP or DNS TCP requests. In some embodiments, DNS proxy server 115 generates a DNS TCP response 155 using DNS entry 175 and sends DNS TCP response 155 to client 120 as a response to DNS TCP request 150.

In an embodiment of data network 105, DNS proxy server 115 responds positively to DNS UDP request 125 of client 120 when there is a match for domain name 130 within DNS entry table 135. When DNS proxy server 115 does not find a match for domain name 130, DNS proxy server 115 does not query DNS server 110 for domain name 130, but suggests client 120 to retry using DNS TCP request 150. This way, DNS proxy server 115 prevents forwarding to DNS server 110 unanswerable DNS UDP requests of bogus or made-up domain names by clients typically arising in a DNS denial of server attack. In a typical DNS denial of service attack embodiment, DNS UDP requests include a domain name not known to DNS servers and an unknown network address. In this typical embodiment, the DNS UDP responses the DNS proxy server 115 sends using the unknown network addresses of corresponding DNS UDP requests will be discarded by data network 105. The DNS server is thus protected from these bogus DNS UDP requests.

In another embodiment using TCP protocol, DNS proxy server 115 responds positively to DNS TCP request 150 of client 120 when there is a match for domain name 130 within DNS entry table 135. When DNS proxy server 115 does not find a match for domain name 130, DNS proxy server 115 does not query DNS server 110 for domain name 130, but suggests client 120 to retry using DNS UDP request 125. Thus, DNS proxy server 115 prevents forwarding to DNS server 110 unanswerable DNS TCP requests. Additionally, other network protocols may be used.

In some embodiments, DNS proxy server 115 or another network device (not shown) of data network 105 includes additional capabilities for protecting against TCP denial of service attack. Such TCP denial of service attack protection capabilities also protect DNS server from DNS denial of service attack using DNS TCP requests. TCP denial of service attack protection capabilities can be implemented into a network device of data network 105 or DNS proxy server 115.

In various embodiments, DNS proxy server 115 employs the current invention after detecting a pre-determined number of unanswerable DNS UDP requests, a burst of unanswerable DNS UDP requests within a short period of time, or a number of unanswerable DNS UDP requests from suspected clients or network address sources. DNS proxy server 115 may employ the current invention after being informed by DNS server 110, or by another network device in data network 105. In another embodiment, DNS server 110 detects a suspicion of DNS denial of service attack and informs DNS proxy server 115.

Figure 2:
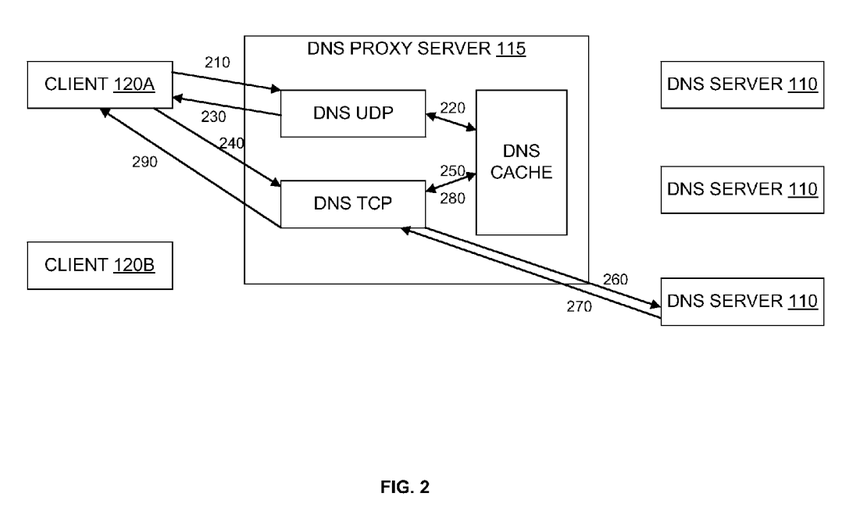
FIG. 2 illustrates another exemplary embodiment of responding to a client DNS request.

FIG. 2 illustrates another exemplary embodiment of responding to a client DNS request. In the exemplary embodiment of FIG. 2, client 120A sends a query in step 210 to a DNS UDP port of DNS proxy server 115, such as UDP port 53 for "domain.com". In step 220, DNS proxy server 115 checks its cache to determine if there is a matching entry for this request. If DNS proxy server 115 does not find a match within its cache for any reason, it then responds to client 120A in step 230 with a TC bit set.

Upon receipt of the TC bit set, client 120A retries the DNS request for "domain.com" using TCP port 53. While a TC bit set is used in this exemplary embodiment, the DNS proxy server 115 may also respond with any other type of response to signal to client 120A to retry the DNS request using a different network protocol, such as TCP, or to retry the DNS request at a different port. Returning to the exemplary embodiment of FIG. 2, in step 240, client 120A retries sending the query to TCP port 53 for "domain.com". In step 250, DNS proxy server 115 checks its cache to determine if there is a matching entry for this request. If DNS proxy server 115 does not find a matching entry for this request, it then forwards the query to the backend DNS server 110 in step 260. While three DNS servers are shown in the exemplary embodiment of FIG. 2, there can be any number of DNS servers in the network.

In step 270, DNS server 110 resolves the query and responds to the DNS proxy server 115 with the DNS response. In step 280, the DNS proxy server adds this DNS response to its cache, and forwards the response to client 120A in step 290. In this way, the DNS cache of the DNS proxy server 115 maintains the DNS response for the DNS request, regardless of whether the request arrives at the DNS proxy server via the UDP protocol or TCP protocol. As will be understood by persons of ordinary skill in the art, other network protocols besides TCP and UDP may also be used in a similar scheme. Also, the steps depicted in FIG. 2 may be performed in any order.

In the exemplary embodiment of FIG. 2, the nonexistent domain response in the DNS cache of DNS proxy server 115 to the initial DNS UDP request may indicate to the DNS proxy server 115 that the DNS request may be a potential denial of service attack. In this way, the method may be used as a detection mechanism for a DNS proxy server 115 to detect a potential denial of service attack. While a nonexistent domain response is discussed herein, other types of DNS responses may also trigger to the DNS proxy server 115 the existence of a potential denial of service attack.

At a later time, client 120B may send a query to UDP port 53 for "domain.com", DNS proxy server 115 checks the cache and finds the entry for "domain.com" and can thus respond to client 120B with the cache entry. In this way, DNS proxy server 115 can now respond to a DNS UDP request at UDP port 53 for "domain.com". By allowing DNS proxy server 115 to share a cache for DNS UDP requests and DNS TCP requests, the cache of DNS proxy server 115 itself may essentially serve as a white list to mitigate denial of service attacks. Additionally, in various embodiments, DNS proxy server 115 may rate limit its DNS response to a client based on other factors, including, but not limited to, non-white list caching.

Figure 3:
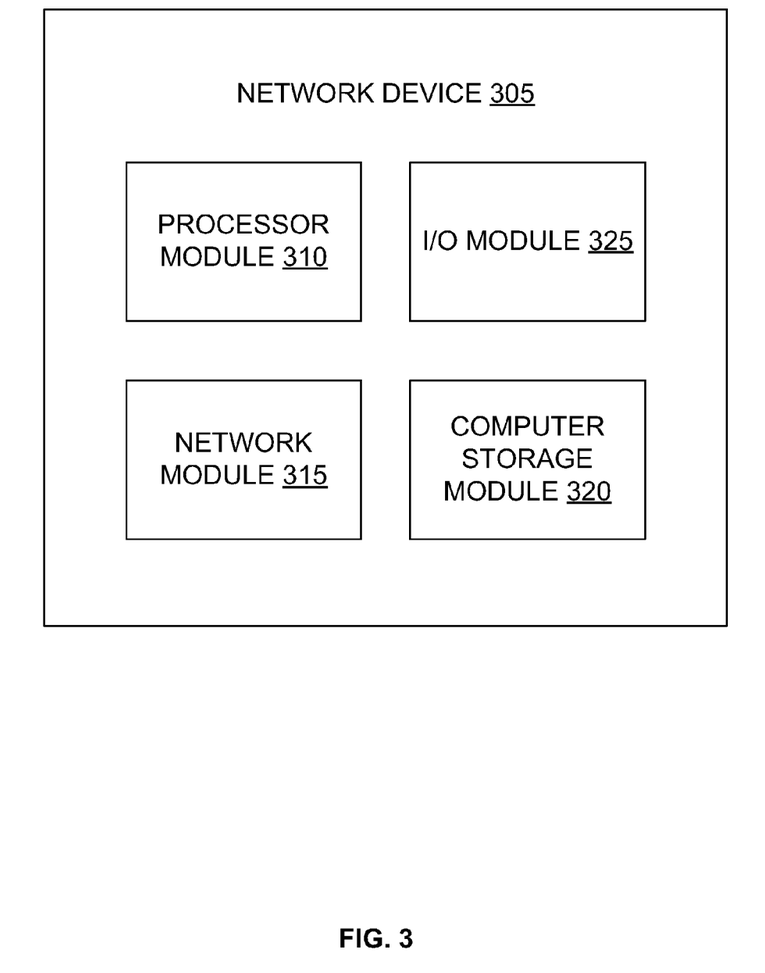
FIG. 3 illustrates an exemplary embodiment of a network device.

FIG. 3 illustrates an exemplary embodiment of a network device 305 of data network 105 which can be a DNS proxy server 115, DNS server 110, or client 120. In various embodiments, network device 305 includes a processor module 310, a network module 315, and a computer storage module 320. Processor module 310 can include one or more processors which may be a micro-processor, an Intel processor, an AMD processor, a MIPS processor, an ARM-based processor, or a RISC processor. Processor module 310 can also include one or more processor cores embedded in a processor. Additionally, processor module 310 can include one or more embedded processors, or embedded processing elements in a Field Programmable Gate Array (FPGA), an Application Specific Integrated Circuit (ASIC), or Digital Signal Processor (DSP).

In exemplary embodiments, network module 315 comprises a network interface such as Ethernet, optical network interface, a wireless network interface, T1/T3 interface, a WAN or LAN interface. Furthermore, network module 315 can include a network processor. Computer storage module 320 comprises RAM, DRAM, SRAM, SDRAM, or any other memory utilized by processor module 310 or network module 315. Computer storage module 320 stores data utilized by processor module 310. Computer storage module 320 can include a hard disk drive, a solid state drive, an external disk, a DVD, a CD, or a readable external disk. Additionally, computer storage module 320 stores one or more computer programming instructions which when executed by processor module 310 or network module 315 implement one or more of the functionality of the present invention. Network device 305 can also include an input/output (I/O) module 325, which may include a keyboard, a keypad, a mouse, a gesture-based input sensor, a microphone, a physical or sensory input peripheral, a display, a speaker, or a physical or sensory output peripheral, or any other input/output module.

Returning to FIGS. 1A-1C, in some embodiments, data network 105 includes an Ethernet network, an ATM network, a cellular network, a wireless network, a Frame Relay network, an optical network, an IP network, or any data communication network utilizing other physical layer, link layer capability, or network layer to carry data packets.

Client device 120 may be a network device connected to data network 105 using a network module of the client device. The client device can be a personal computer, a laptop computer, a tablet, a smartphone, a mobile phone, an Internet phone, a netbook, a home gateway, a broadband gateway, a network appliance, a set-top box, a media server, a personal media play, a personal digital assistant, an access gateway, a networking switch, a server computer, a network storage computer, or any computing device comprising a network module and a processor module.

Domain name 130 may include a domain name of a network device, a domain name associated to an IP address, or a string of characters such as "abcdefg.com", "www.123456.com", "bogus.name.org", "98X45IE.01924.ty", "server189.mail.yahoo.com", or "nonexisting.domain".

In some embodiments, DNS entry 140 includes a domain name and a network address such as IP address. Furthermore, DNS entry 140 may include other information associated to the domain name of DNS entry 140 that is useful for client 120.

In various embodiments, DNS proxy server 115 is a network device as illustrated in FIG. 3, a server load balancer (SLB), an application delivery controller (ADC), a traffic manager, a server computer, a router, a network service gateway, a network switch, or a server software module executed by a processor module of a network device such as a SLB, ADC, traffic manager, a router, a network switch, a network service gateway or a server computer.

Figure 4:
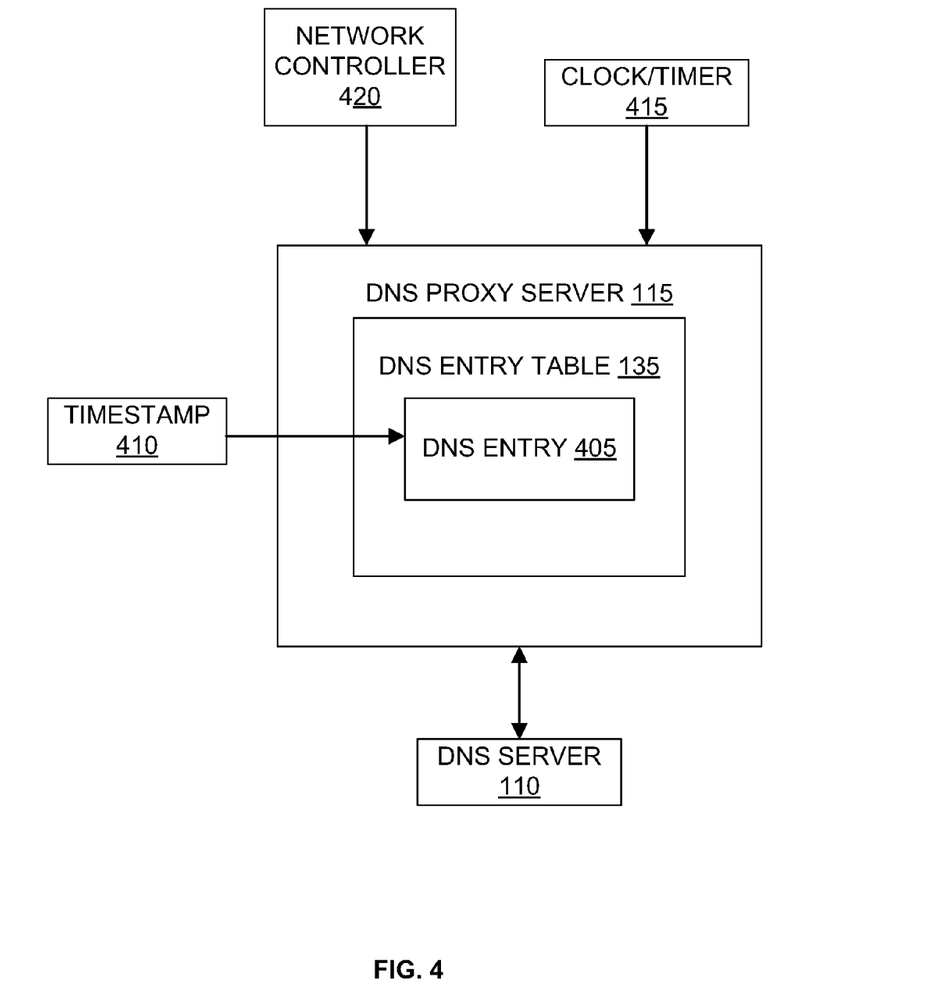
FIG. 4 illustrates an exemplary embodiment of a DNS proxy server managing a DNS entry table.

FIG. 4 illustrates an exemplary embodiment of managing a DNS entry table by a DNS proxy server. In some embodiments, DNS entry table 135 includes a DNS entry 405. DNS entry 405 is associated with a timestamp 410. Timestamp 410 indicates availability of DNS entry 405. For example, timestamp 410 includes an expiration time such as 24 hours, 5 hours, 10 minutes, 72 hours, a week, Jul. 24, 2020 at 12:00 am, a timer indication such as next timer or the 4th timer, or a time/clock indication. In various embodiments, DNS proxy server 115 is connected to a clock or timer 415. DNS proxy server 115 examines timer 415 and compares it to timestamp 410. If DNS proxy server 115 determines timestamp 410 to be expired, DNS proxy server 115 removes DNS entry 405 from DNS entry table 135, or marks DNS entry 405 invalid in DNS entry table 135. DNS proxy server 115 may not use DNS entry 405 in matching domain name of subsequent DNS UDP/TCP requests after DNS entry 405 becomes invalid.

DNS proxy server 115 can create DNS entry 405 from information received from DNS server 110 as illustrated in FIG. 1C. DNS proxy server 115 stores DNS entry 405 into DNS entry table 135. DNS server 115 associates DNS entry 405 with timestamp 410 while storing DNS entry 405 into DNS entry table 135. DNS server 115 may create timestamp 410 for DNS entry 405 or use an existing timestamp associated with another DNS entry in DNS entry table 135.

In some embodiments, DNS proxy server 115 creates DNS entry table 135 by downloading a plurality of DNS entry information from DNS server 110. This information may be updated on a fixed periodic basis, upon certain trigger events, or as directed by a network administrator. In another embodiment, DNS proxy server 115 creates DNS entry table 135 prior to responding to DNS request from a client device. DNS proxy server 115 may also create DNS entry table 135 after DNS proxy server 115 receives a DNS request from a client device. From time to time, DNS server 110 may send a plurality of DNS entry information to DNS proxy server 115. In one embodiment, DNS proxy server 115 receives the plurality of DNS entry information, creates a plurality of DNS entries, and creates DNS entry table 135, or replaces a plurality of existing DNS entries in DNS entry table 135 with the created DNS entries.

DNS proxy server 115 may receive the plurality of DNS entry information from a network controller 420 instead of DNS server 110. In some embodiments, DNS proxy server 115 receives DNS entry table 135 from network controller 420 or DNS server 110.

Thus, methods and systems for protecting a data network from DNS denial of service attacks are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed:

1. A method for a Domain Name System proxy server to protect a data network from a Domain Name Service (DNS) denial of service attack, the method comprising:
   receiving a first DNS request from a client for a domain name, the first DNS request being a DNS User Datagram Protocol (UDP) request;
   determining the domain name included in the DNS UDP request does not match with a plurality of domain names in a DNS entry table at a shared cache in the DNS proxy server, wherein the determining further comprises one or more of:
      detecting a pre-determined plurality of unanswerable DNS requests from the client, a burst of unanswerable DNS requests within a short period of time from the client, or a plurality of unanswerable DNS requests from suspected clients or network address sources;
   responding to the client to retry the DNS UDP request as a second DNS request via a DNS Transmission Control Protocol (TCP) request;
   querying a DNS server for the domain name in the DNS TCP request;
   receiving a DNS response from the DNS server; and
   determining, based at least on the DNS response, that the first DNS UDP request from the client is characteristic of a DNS denial of service attack.

2. The method of claim 1, wherein the responding to the client to retry the DNS UDP request as a DNS TCP request comprises responding to the client with a truncated (TC) bit set.

3. A method for a Domain Name System proxy server to protect a data network from a Domain Name Service (DNS) denial of service attack, the method comprising:
   receiving a first DNS request from a client for a domain name, the first DNS request being a DNS User Datagram Protocol (UDP) request;
   determining the domain name included in the DNS UDP request does not match with a plurality of domain names in a DNS entry table of a shared cache at the DNS proxy server, wherein the determining further comprises one or more of:
      detecting a pre-determined plurality of unanswerable DNS requests from the client, a burst of unanswerable DNS requests within a short period of time from the client, or a plurality of unanswerable DNS requests from suspected clients or network address sources;
   responding to the client to retry the DNS UDP request as a second DNS request via a DNS Transmission Control Protocol (TCP) request;
   querying a DNS server for the domain name in the DNS TCP request;
   receiving a DNS response from the DNS server in response to the DNS TCP request;
   determining from the DNS response to the second DNS TCP request that the first DNS UDP request from the client is not characteristic of a DNS denial of service attack; and
   forwarding the received DNS response to the client.

4. The method of claim 3, wherein the DNS proxy server creates a DNS entry in the DNS entry table of the shared cache of the DNS proxy server for the DNS response to the DNS TCP request.

5. The method of claim 3, wherein the shared cache at the DNS proxy server is used to respond to future DNS TCP requests and future DNS UDP requests.

6. The method of claim 3, further comprising:
   receiving a DNS UDP request from a second client;
   determining a domain name included in the DNS UDP request does match with a plurality of domain names in a DNS entry table at the shared cache of the DNS proxy server; and
   responding to the client with a DNS response.

7. A system for protecting a data network from a Domain Name Service (DNS) denial of service attack, the system comprising:
   a DNS proxy server configured to:
      receive a first DNS request from a client for a domain name, the first DNS request being a DNS User Datagram Protocol (UDP) request;
      determine the domain name included in the DNS UDP request does not match a plurality of domain names in a DNS entry table at a shared cache of the DNS proxy server, the determination comprising one or more of:
         detecting a pre-determined plurality of unanswerable DNS requests from the client, a burst of unanswerable DNS requests within a short period of time from the client, or a plurality of unanswerable DNS requests from suspected clients or network address sources; and
      respond to the client to retry the DNS UDP request as a second DNS request via a DNS Transmission Control Protocol (TCP) request;
      query a DNS server for the domain name in the DNS TCP request;
      receive a DNS response from the DNS server; and
      determine based at least on the DNS response, that the first DNS UDP request from the client is characteristic of a DNS denial of service attack.

8. The system of claim 7, wherein the DNS proxy server responding to the client to retry the first DNS UDP request as a second DNS TCP request comprises responding to the client with a truncated (TC) bit set.

9. The system of claim 7, wherein the DNS proxy server is further configured to:
   query a DNS server for the domain name in the DNS TCP request;
   receive a DNS response from the DNS server; and
   forward the DNS response to the client.

10. The system of claim 9, wherein the DNS proxy server creates a DNS entry in the DNS entry table of the DNS proxy server for the DNS response.

11. The system of claim 9, wherein the DNS proxy server stores the DNS entry from the DNS response in the DNS entry table in order to respond to future DNS requests.

12. The system of claim 7, wherein if there is a match between the domain name in the DNS request and a domain name of a DNS entry of DNS entry table, the DNS proxy server sends a DNS response using the DNS entry to the client.

13. The system of claim 7, wherein the DNS proxy server is further configured to:
   query a network controller for the domain name in the DNS TCP request;
   receive DNS information from the network controller; and
   forward the DNS information to the client.

14. A system for protecting a data network from a Domain Name Service (DNS) denial of service attack, the system comprising:
   a DNS proxy server with a plurality of ports, the DNS proxy server configured to:
      receive a DNS request from a client at a first port of the DNS proxy server;
      determine a domain name included in the DNS request does not match a plurality of domain names in a DNS entry table at a shared cache of the DNS proxy server, wherein the determining further comprises one or more of:
         detecting a pre-determined plurality of unanswerable DNS requests from the client, a burst of unanswerable DNS requests within a short period of time from the client, or a plurality of unanswerable DNS requests from suspected clients or network address sources; and
      respond to the client to retry the DNS request at a second port of the DNS proxy server;
      receive a DNS request at the second port of the DNS proxy server;
      query a DNS server for the domain name in the DNS request received at the second port of the DNS proxy server;
      receive a DNS response from the DNS server; and
      determine, based at least on the DNS response, that the DNS request received at the first port of the DNS server is characteristic of a DNS denial of service attack.

15. The system of claim 14, wherein the received DNS request is a UDP request.

16. The system of claim 14, wherein the received DNS request is a TCP request.

17. The system of claim 14, wherein the domain name in the DNS request is a name of a network device.

18. The system of claim 14, wherein the DNS proxy server creates a DNS entry in the DNS entry table of the DNS proxy server for the DNS response.

19. The system of claim 14, wherein the DNS proxy server stores the DNS entry from the DNS response in the DNS entry table in order to respond to future DNS requests.

* * * * *